Patented June 29, 1954

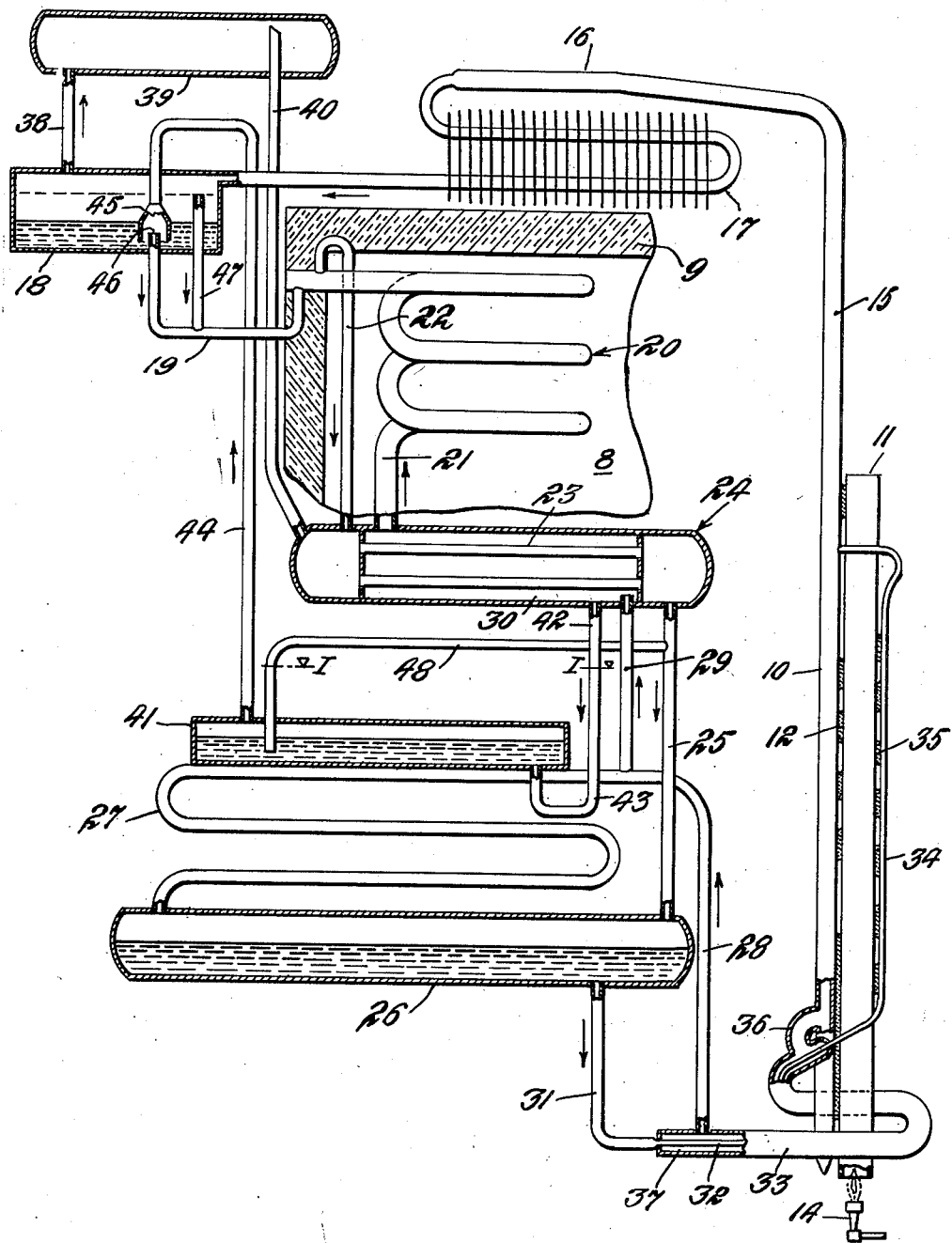

2,682,156

UNITED STATES PATENT OFFICE 2,682,156

DISTRIBUTION OF REFRIGERANT IN ABSORPTION REFRIGERATION SYSTEM

Hugo Malcolm Ullstrand, Stockholm, Sweden, assignor to Aktiebolaget Elektrolux, Stockholm, Sweden, a corporation of Sweden Application April 8, 1950, Serial No. 154,743

Claims priority, application Sweden April 11, 1949

20 Claims. (Cl. 62—119.5)

My invention relates to refrigeration, and more particularly to refrigeration systems of the type in which refrigerant evaporates at a place of evaporation and such refrigerant vapor is absorbed by an absorbent at a place of absorption.

It is an object of the invention to improve the distribution of refrigerant in systems of this type, particularly to obtain better use of cooling effect. I accomplish this by flowing liquid refrigerant in an absorption refrigeration system from a source of supply, and modifying the distribution in the system of such liquid refrigerant from the source of supply responsive to flow of unevaporated refrigerant from a place of evaporation in which useful refrigeration is produced.

The above and other objects and advantages of the invention will be more fully understood upon reference to the following description and accompanying drawing forming a part of this specification, and of which the single figure illustrates more or less diagrammatically a refrigeration system embodying the invention.

Referring to the drawing, I have shown my invention in connection with an absorption refrigeration system of a uniform pressure type which is well known in the art and in which an inert pressure equalizing gas is employed. Such a refrigeration system comprises a generator or boiler 10 containing a refrigerant, such as ammonia, in solution in a body of absorption liquid, such as water. Heat is supplied to the boiler 10 from a heating tube or flue 11 thermally connected therewith at 12, as by welding, for example. The heating tube 11 may be heated in any suitable manner, as by an electrical heating element disposed within the lower part of the heating tube or by a liquid or gaseous fuel burner 14 which is adapted to project its flame into the lower end of the tube.

The heat supplied to the boiler 10 and its contents expels refrigerant vapor out of solution, and such vapor passes upwardly through a conduit 15 and air cooled rectifier 16 into an air cooled condenser 17 in which it is condensed and liquefied. As will be explained more fully hereinafter, liquid refrigerant flows from condenser 17 through a vessel 18 and conduit 19 into an evaporator or cooling unit 20. In the evaporator 20 liquid refrigerant evaporates and diffuses into an inert pressure equalizing gas, such as hydrogen, which enters through a conduit 21. Due to evaporation of refrigerant into inert gas, a refrigerating effect is produced with consequent absorption of heat from the space 8 thermally segregated at 9 from the surroundings.

The rich mixture of refrigerant vapor and inert gas formed in cooling unit 20 flows from the upper part thereof through a conduit 22, one passage 23 of a gas heat exchanger 24, conduit 25 and absorber vessel 26 into the lower end of an absorber coil 27. In absorber coil 27 the rich gas mixture flows counter-current to downwardly flowing absorption liquid which enters through a conduit 28. The absorption liquid absorbs refrigerant vapor from inert gas, and inert gas weak in refrigerant flows from absorber coil 27 in a path of flow including a conduit 29, another passage 30 of gas heat exchanger 24 and conduit 21 into the lower part of the cooling unit 20.

The circulation of gas in the gas circuit just described is due to the difference in specific weight of the columns of gas rich and weak, respectively, in refrigerant vapor. Since the column of gas rich in refrigerant vapor and flowing from cooling unit 20 to the absorber coil 27 is heavier than the column of gas weak in refrigerant vapor and flowing from the absorber coil 27 to cooling unit 20, a force is produced or developed within the system for causing circulation of gas in the manner described.

Absorption solution enriched in refrigerant flows from the absorber vessel 26 through a conduit 31 and an inner passage or pipe 32 of a liquid heat exchanger 33 into the lower end of a vapor lift pipe or tube 34. Liquid is raised by vapor-liquid lift action through pipe 34, which is in thermal exchange relation with the heating tube 11 at 35, into the upper part of boiler 10. Refrigerant vapor expelled out of solution in boiler 10, together with refrigerant vapor entering through pipe 34, flows upwardly through conduit 15 to the condenser 17, as previously explained. The absorption liquid from which refrigerant vapor has been expelled flows from the boiler 10 through a connection 36, an outer pipe or passage 37 of the liquid heat exchanger 33 and conduit 28 into the upper part of the absorber coil 27. The circulation of absorption solution in the liquid circuit just described is effected by raising of liquid through pipe 34.

The outlet end of condenser 17 is connected by vessel 18, conduit 38, vessel 39 and conduit 40 to a part of the gas circuit, as at one end of gas heat exchanger 24, for example, so that any inert gas which may pass through the condenser can flow into the gas circuit. Refrigerant vapor not liquefied in the condenser 17 flows through vessel 18 and conduit 38 to displace inert gas in vessel 39 and force such gas into the gas circuit. The effect of forcing gas into the gas circuit in this manner is to raise the total pressure in the entire system whereby an adequate condensing pressure is obtained to insure condensation of refrigerant vapor in condenser 17.

Although the evaporator or cooling unit 20 is diagrammatically shown as a single element or section, it is to be understood that in practice the cooling unit may form a number of evaporator sections operable at different temperature levels for different refrigerating purposes. During operation of the refrigeration system the variations in load on the cooling unit 20 may be such that at times liquid refrigerant evaporates at a rate which is less than the rate at which liquid refrigerant is formed in condenser 17 and supplied to the cooling unit.

In accordance with my invention liquid refrigerant passing from the evaporator or cooling unit 20 is utilized to control distribution in the refrigeration system of the liquid refrigerant supplied by the condenser 17. In the preferred embodiment illustrated excess liquid refrigerant passing from the cooling unit 20 is brought into heat exchange relation with a heat dissipating part of the refrigeration system to heat such excess liquid sufficiently to vaporize the liquid, and the vapor thus formed is effectively employed to regulate and control the delivery of liquid refrigerant to the cooling unit 20 from the condenser 17.

I accomplish this by providing a vessel 41 which is arranged in heat exchange relation with the absorber coil 27 and to which unevaporated refrigerant flows from the lower part of cooling unit 20 through conduit 21, passage 30 of gas heat exchanger 24 and conduit 42 having the lower end thereof formed to provide a U-shaped liquid trap 43 which communicates with the bottom of the vessel 41. Heat liberated with absorption of refrigerant vapor in absorber 27 effects vaporization of liquid refrigerant in vessel 41, and the vapor thus formed passes upwardly through a conduit 44 whose upper end extends downwardly in the vessel 18.

The upper discharge end of vapor conduit 44, which extends above the highest possible liquid level that can be maintained in vessel 18, is formed with an enlarged portion 45 having a downwardly depending skirt terminating at a level below the upper inlet opening 46 of conduit 19, such opening 46 being disposed above and spaced from the bottom of the vessel 18. The enlarged portion 45 of conduit 44, which forms a bell-shaped chamber, serves to trap vapor flowing thereto from vessel 41 and depresses the liquid level below the inlet opening 46 of conduit 19. Thus, when the vapor pressure in the enlarged conduit portion 45 reaches a definite value, the flow of liquid from vessel 18 through U-shaped conduit 19 to evaporator unit 20 is blocked.

In effect, a vapor lock is produced at 45 in the path of flow of liquid refrigerant from the condenser 17 to cooling unit 20, and liquid refrigerant supplied by the condenser to vessel 18 collects in the latter until it reaches the level at which overflow of liquid into conduit 47 takes place. The conduit 47 may be referred to as an overflow conduit whose lower end is connected to conduit 19, thereby enabling liquid from condenser 17 to flow to the cooling unit 20 after a predetermined quantity of liquid refrigerant collects in the vessel 18.

In addition, a conduit 48 is provided having the lower end terminating in the bottom part of vessel 41 and the upper end communicating with a conduit, such as the conduit 25, for example, for draining liquid to the absorption liquid circuit. Under certain operating conditions the conduit 48 may also serve as a vent conduit. When unevaporated refrigerant passes into the receiver or vessel 41 and such refrigerant is vaporized, the pressure in the vapor space of the receiver builds up sufficiently to form liquid columns in the lower end of conduit 48 and U-shaped trap 43, as indicated at I in the drawing. Under certain conditions when liquid collects in the vessel 41 which may include absorption solution, for example, the liquid level in conduit 48 reaches a sufficiently high level so that such liquid overflows into conduit 25. In this way vessel 41 is purged of absorption liquid collecting therein and such liquid is drained into the absorption liquid circuit by overflow from the upper end of conduit 48.

Under certain operating conditions a quantity of unevaporated refrigerant may pass from the cooling unit 20 into the vessel 41 and all of such refrigerant may be vaporized in the latter. If the load on the refrigeration system is increased, as by inserting into the freezing section of the cooling unit trays containing water to be frozen, for example, more liquid refrigerant can evaporate and diffuse into the inert gas and the flow of unevaporated refrigerant into vessel 41 may stop. When this occurs substantially all of the liquid in vessel 41 vaporizes, whereby the latter becomes depleted of liquid and the vapor pressure in conduit 44 drops to such an extent that liquid refrigerant can then flow by gravity from vessel 18 through conduit 19 into cooling unit 20 for gravity flow through the latter.

When unevaporated refrigerant again passes from cooling unit 20 into vessel 41, the heat of absorption becomes effective to vaporize such unevaporated refrigerant and the vapor thus formed is advantageously utilized to produce a vapor lock at 46 in the path of flow of refrigerant from the condenser 17 to the cooling unit 20. In its broadest aspect an arrangement is provided for controlling flow of liquid refrigerant responsive to flow of excess or unevaporated refrigerant passing from the place of evaporation, the arrangement possessing the further advantage that liquid refrigerant normally flowing from the condenser to the evaporator is collected and made available for use in the place of evaporation when the flow of refrigerant thereto is no longer retarded or held back.

The vessel 18 in which liquid refrigerant collects and is stored is also advantageously employed to vary the concentration of refrigerant in the absorption solution circulating in the absorption liquid circuit including boiler 10 and absorber 27. Under difficult operating conditions, as when the absorber and condenser are operating under high temperature conditions, it is desirable to circulate absorption solution which is weaker in refrigerant than when normal temperature conditions prevail in the condenser and absorber. This is so because absorption solution that is weaker in refrigerant than ordinarily will be more effective to absorb refrigerant from inert gas in the absorber under high temperature conditions, and in this way the partial pressure of refrigerant in the inert gas supplied to the evaporator will be maintained at a low value to insure the maintenance of a desired low temperature at the place of evaporation.

When the partial pressure of refrigerant in the inert gas becomes relatively high which is a factor that brings about flow of unevaporated refrigerant from the cooling unit, the occurrence of inert gas having a high partial pressure of refrigerant is advantageously employed in accord with the invention to block the flow of liquid refrigerant to the cooling unit 20 and collect such liquid in vessel 18, thereby withdrawing liquid refrigerant from solution in the absorption liquid circuit. Hence, unevaporated liquid refrigerant cannot freely go into solution in the absorption liquid circuit and the latter will operate with solution having a weaker concentration of refrigerant than at other times.

When the operating conditions change and the condenser and absorber no longer operate under the high temperature conditions referred to above, the solution circulating in the absorption liquid circuit may have a higher concentration of refrigerant without adversely affecting the capacity of the refrigeration system. By reason of the change in operating conditions just mentioned, less of the withdrawn liquid refrigerant will be stored in the vessel 18, so that the amount of refrigerant withdrawn from the absorption liquid circuit will vary with such changes in conditions. Since the vapor lock will be formed intermittently at 45 or 46 when excess liquid refrigerant passes into vessel 41 and such vapor lock will break of its own accord when the vessel 41 becomes depleted of liquid and the vapor pressure in conduit 44 falls sufficiently, an automatic arrangement is provided for controlling the flow of liquid refrigerant to cooling unit 20 responsive to the demand for refrigeration and for storing the refrigerant to produce useful refrigeration instead of going to waste, that is, simply allowing it to return to the absorption liquid circuit in a liquid state.

In view of the foregoing, it will be apparent that liquid refrigerant from the condenser 17 will be stored in the vessel 18 during periods of low load. Under such conditions the vessel 18 serves as a reservoir for holding a reserve quantity of liquid refrigerant which is immediately available upon a demand for refrigeration to satisfy such refrigerating demand in a fraction of the time it would take if all of the liquid refrigerant were supplied to the cooling unit from the condenser upon being liquefied. Further, the provision of the reservoir vessel 18 also enables the refrigeration system to satisfy and meet an abnormally high demand for refrigeration beyond the usual capacity of the system as determined by normal ice freezing capacity.

In the preferred embodiment shown and described above, unevaporated refrigerant flows from the evaporator or cooling unit 20 to the vessel 41 which constitutes a place in the refrigeration system which is thermally segregated and removed from space 8, the immediate environment in which the cooling unit 20 exercises influence. During normal operation of the refrigeration system the vessel 41, of course, will be maintained at a higher temperature than that at which the cooling unit 20 will be maintained. When substantially all of the liquid in the vessel 41 vaporizes and the vapor pressure in conduit 44 drops sufficiently, liquid cooling agent accumulated in vessel 18 freely flows downwardly therefrom by gravity through conduit 19 to the upper part of cooling unit 20.

The enlarged portion 45 at the upper end of the conduit 44 and inlet opening 46 of conduit 19 essentially form a valve structure when the vapor pressure builds up in the conduit 44. In this way the flow of liquid from vessel 18 to the cooling unit 20 is reduced and liquid is accumulated in the vessel 18. The building up of the vapor pressure in the enlarged part 45 of the conduit 44 to reduce the flow of liquid to the cooling unit 20 is affected by the physical act of unevaporated liquid refrigerant passing from the cooling unit 20 to the vessel 41 and is unaffected by the temperature per se of the cooling unit 20.

While a single embodiment of the invention has been shown and described, it will be apparent that modifications and changes may be made without departing from the spirit and scope of the invention. I therefore aim to cover all variations and modifications which come within the true spirit and scope of my invention, as pointed out in the following claims.

What is claimed is:

1. In the art of refrigeration employing a system using inert gas into which refrigerant normally evaporates in the presence of such gas at a place of evaporation to produce useful refrigeration, the improvement which comprises normally flowing liquid refrigerant from a place of condensation to said place of evaporation for gravity flow therethrough, modifying such normal flow of refrigerant responsive to a condition affected by flow of unevaporated refrigerant from said place of evaporation to a place in the system which is removed from the immediate environment in which said place of evaporation exercises influence, and terminating such modified operation responsive to cessation of flow of unevaporated refrigerant from said place of evaporation.

2. In the art of refrigeration employing a system in which refrigerant normally evaporates in the presence of an inert gas at a place of evaporation to produce useful refrigeration and refrigerant vapor is absorbed into an absorbent at a place of absorption, the improvement which comprises flowing liquid refrigerant in the system from a source of supply to a place for holding liquid and from the latter to said place of evaporation, and stopping the flow of such liquid refrigerant from said liquid holding place responsive to a condition affected by flow of excess unevaporated refrigerant from said place of evaporation to a place in the system which is removed from the immediate environment in which said place of evaporation exercises influence.

3. In the art of refrigeration employing a system in which refrigerant evaporates at a place of evaporation and refrigerant vapor is absorbed into an absorbent at a place of absorption, the improvement which comprises flowing liquid refrigerant in a path of flow from a source of supply to said place of evaporation, flowing unevaporated refrigerant from said place of evaporation to a place which is thermally segregated from the environment in which said place of evaporation exercises influence, vaporizing refrigerant at said thermally segregated place, and utilizing said last-mentioned vapor to block flow of liquid refrigerant in said path of flow leading to said place of evaporation.

4. In the art of refrigeration employing a system in which refrigerant evaporates at a place of evaporation and refrigerant vapor is absorbed into an absorbent at a place of absorption, the improvement which comprises flowing liquid refrigerant in a path of flow from a source of supply to said place of evaporation, utilizing heat derived from a part of the system which is normally at a higher temperature than that of the environment in which said place of evaporation exercises influence to vaporize unevaporated refrigerant flowing from said place of evaporation, and utilizing said last-mentioned vapor to reduce flow of liquid refrigerant in said path of flow leading to said place of evaporation.

5. In the art of refrigeration employing a system having a circuit for inert gas including an evaporator in which liquid refrigerant evaporates in the presence of the gas and an absorber which also forms a part of said circuit and in which refrigerant is absorbed into solution, the improvement which comprises supplying liquid refrigerant to said evaporator in a path of flow, withdrawing excess liquid refrigerant from said evaporator upon decrease in load, supplying heat of absorption to such withdrawn refrigerant to vaporize the liquid, holding up the supply of liquid refrigerant in said path of flow and storing such liquid when the vapor produced by the heat of absorption reaches a definite pressure, and again supplying liquid refrigerant to said evaporator when said vapor pressure decreases.

6. Absorption refrigeration apparatus comprising a generator, a condenser, an absorber, an evaporator, and conduits connecting said aforementioned parts to provide a circuit for circulation of absorption liquid between said generator and said absorber, a circuit for circulation of cooling agent through said generator, condenser, evaporator and absorber, and a circuit for circulation of an auxiliary agent between said absorber and evaporator, means in said cooling agent circuit for accumulating liquid cooling agent at a region from which the agent flows to said evaporator, and means to instigate flow of such accumulated cooling agent to said evaporator to produce useful refrigeration in the latter responsive to cessation of flow of unevaporated liquid cooling agent from said evaporator, said accumulating means embodying provisions for freely flowing accumulated cooling agent downwardly therefrom by gravity when such flow is instigated by said last-mentioned means.

7. Absorption refrigeration apparatus comprising a generator, a condenser, an absorber, an evaporator, and conduits connecting said aforementioned parts to provide a circuit for circulation of absorption liquid between said generator and said absorber, a circuit for circulation of cooling agent through said generator, condenser, evaporator and absorber, and a circuit for circulation of an auxiliary agent between said absorber and evaporator, structure operable to supply liquid cooling agent to said evaporator at a rate greater than the rate at which such liquid is formed in said condenser, and means responsive to a condition affected by cessation of flow of one of the liquids in the system to render said structure operable.

8. An absorption refrigeration system containing an auxiliary agent and including a generator, a condenser and an evaporator, conduit means connecting said aforementioned parts whereby refrigerant fluid expelled from an absorbent in said generator is liquefied in said condenser and such liquid is conducted to said evaporator for evaporation in the latter in the presence of the auxiliary agent, structure operable to supply liquid to said evaporator at a rate greater than the rate at which liquid refrigerant is formed in said condenser, and means responsive to a condition affected solely by flow of refrigerant fluid in the system for controlling said structure.

9. An absorption refrigeration system containing an auxiliary agent and including a generator, a condenser and an evaporator, conduit means connecting said aforementioned parts whereby refrigerant fluid expelled from an absorbent in said generator is liquefied in said condenser and such liquid is conducted to said evaporator for evaporation in the latter in the presence of the auxiliary agent, structure operable to supply liquid to said evaporator at a rate greater than the rate at which liquid refrigerant is formed in said condenser, means making use of unevaporated refrigerant from said evaporator for rendering said structure operable to accumulate liquid refrigerant, said last-mentioned means embodying provisions for rendering said structure operable to supply accumulated liquid refrigerant to said evaporator when the supply of unevaporated refrigerant from said evaporator is depleted by vaporization.

10. In the art of refrigeration employing a system using inert gas into which refrigerant normally evaporates to produce useful refrigeration, the improvement which comprises providing refrigerant fluid in a liquid state at a place of supply, flowing such liquid from said place of supply to said place of evaporation, and controlling flow of liquid to said place of evaporation from said place of supply responsive to a condition affected by flow of unevaporated refrigerant fluid from said place of evaporation to a place in the system which is removed from the immediate environment in which said place of evaporation exercises influence.

11. In the art of refrigeration employing a system using inert gas into which refrigerant normally evaporates to produce useful refrigeration, the improvement which comprises providing refrigerant fluid in a liquid state at a place of supply, flowing such liquid from said place of supply to a place of evaporation, and controlling flow of liquid to said place of evaporation from said place of supply responsive to a condition affected by flow of unevaporated refrigerant fluid from said place of evaporation to another place in the system at a higher temperature than that at which said place of evaporation is maintained during normal operation of the system.

12. In the art of refrigeration employing a system using inert gas into which refrigerant normally evaporates at a place of evaporation to produce useful refrigeration, the improvement which comprises providing refrigerant fluid in a liquid state at a place of supply, flowing such liquid in a path of flow from said place of supply to said place of evaporation, said path of flow having a place for accumulating liquid and from which liquid flows only to said place of evaporation, and controlling flow of liquid from said place of accumulation to said place of evaporation responsive to a condition affected by flow of unevaporated refrigerant fluid from said place of evaporation to a place in the system which is removed from the immediate environment in which said place of evaporation exercises influence.

13. In the art of refrigeration employing a system using inert gas into which refrigerant normally evaporates to produce useful refrigeration, the improvement which comprises providing refrigerant fluid in a liquid state at a place of supply, flowing such liquid in a path of flow from said place of supply to said place of evaporation, said path of flow having a place for accumulating liquid and from which liquid flows only to said place of evaporation, and reducing the flow of liquid from said place of supply to said place of evaporation and accumulating liquid at said place of accumulation responsive to a condition affected by flow of unevaporated refrigerant fluid from said place of evaporation to a place in the system which is removed from the immediate environment in which said place of evaporation exercises influence.

14. In a refrigeration system, means to produce refrigerant in a liquid state, evaporator structure, connections to distribute such liquid in the system from said liquid producing means, said connections comprising conduit means including a vessel for flowing the liquid to said evaporator structure for evaporation therein to produce useful refrigeration, and means for reducing the flow of liquid to said evaporator structure through said conduit means to accumulate liquid in said vessel, said flow reducing means being operable responsive to a condition which is unaffected by the temperature per se of said evaporator structure and is affected by the physical act of unevaporated liquid passing from said evaporator structure.

15. In a refrigeration system, means to produce liquid, an evaporator, conduit means including a vessel to flow liquid from said liquid producing means to said evaporator for evaporation therein to produce useful refrigeration, said conduit means embodying valve structure for reducing flow of liquid to said evaporator through said conduit means to accumulate liquid in said vessel, and means for rendering said valve structure operable to reduce flow of liquid to said evaporator, said last-mentioned means being operable responsive to a condition which is unaffected by the temperature per se of said evaporator structure and is affected by the physical act of unevaporated liquid passing from said evaporator.

16. In a refrigeration system, means to produce liquid, an evaporator, conduit means to flow liquid from said liquid producing means to said evaporator, said conduit means embodying valve structure for regulating flow of liquid therethrough and provisions for conducting liquid from said valve structure only to said evaporator, and control means for controlling said valve structure, said control means being operable responsive to a condition in the system which is created only when unevaporated liquid passes from said evaporator.

17. Apparatus as set forth in claim 16 in which all parts of said valve structure are always stationary.

18. In a refrigeration system, means to produce liquid, an evaporator, conduit means to flow liquid from said liquid producing means to said evaporator comprising a vessel adapted to hold a body of liquid and an overflow connection having an inlet removed from the bottom of said vessel, said conduit means embodying valve structure including the overflow inlet for controlling flow of liquid therethrough, means for receiving unevaporated liquid passing from said evaporator, and means operable responsive to unevaporated liquid passing to said receiving means from said evaporator for regulating said valve structure, said last-mentioned means including provisions for varying the surface level of the liquid body at the immediate vicinity of the overflow inlet.

19. Apparatus as set forth in claim 18 in which the provisions for varying the surface level of the liquid body at the immediate vicinity of the overflow inlet includes means for heating the unevaporated liquid passing to said receiving means by heat derived from the system to produce vapor, and means for bringing the last-mentioned vapor in physical contact with the surface level of the liquid body.

20. In a refrigeration system, means to produce refrigerant in a liquid state, evaporator structure, connections to distribute such liquid in the system from said liquid producing means, said connections comprising conduit means including a vessel for conducting the liquid to said evaporator structure for evaporation therein to produce useful refrigeration, and means for accumulating liquid in said vessel including a receiver and conduit means for conducting to such receiver unevaporated refrigerant passing from said evaporator structure and provisions for vaporizing liquid in said receiver, said accumulating means being operable responsive to a condition which is unaffected by the temperature per se of said evaporator structure and is affected by the physical act of unevaporated liquid passing from said evaporator structure.

References Cited in the file of this patent

UNITED STATES PATENTS

| Number | Name | Date |
|---|---|---|
| 1,935,866 | Weaver | Nov. 21, 1933 |
| 2,181,528 | Widell | Nov. 28, 1939 |
| 2,184,726 | Ullstrand | Dec. 26, 1939 |
| 2,210,609 | Ullstrand | Aug. 6, 1940 |
| 2,241,361 | Gross | May 6, 1941 |
| 2,248,178 | Kuenzli | July 8, 1941 |
| 2,252,791 | Ullstrand | Aug. 19, 1941 |
| 2,266,783 | Lynger | Dec. 23, 1941 |
| 2,295,064 | Ullstrand | Sept. 8, 1942 |
| 2,303,816 | Brace | Dec. 1, 1942 |
| 2,307,165 | Siedel | Jan. 5, 1943 |
| 2,345,505 | Siedel | Mar. 28, 1944 |
| 2,484,669 | Backstrom | Oct. 11, 1949 |